United States Patent [19]

Silver

[11] 4,332,079
[45] Jun. 1, 1982

[54] METHOD OF MAKING ROTOR RECTANGULARLY SHAPED TONGUES

[75] Inventor: Alexander Silver, Tarzana, Calif.

[73] Assignee: The Garrett Corporation, Los Angeles, Calif.

[21] Appl. No.: 138,017

[22] Filed: Apr. 7, 1980

Related U.S. Application Data

[62] Division of Ser. No. 973,344, Dec. 26, 1978, Pat. No. 4,260,921.

[51] Int. Cl.³ .......................................... H02K 15/02
[52] U.S. Cl. ................................. 29/598; 310/153; 310/156
[58] Field of Search ................. 29/596, 598; 310/261, 310/262, 153, 156, 218, 42, 43

[56] References Cited

U.S. PATENT DOCUMENTS

| | | | |
|---|---|---|---|
| 2,060,260 | 11/1936 | Spengler | 310/156 |
| 2,719,931 | 10/1955 | Kober | 310/156 |
| 3,027,474 | 3/1962 | Rosenberry, Jr. | 310/211 |
| 3,083,311 | 3/1963 | Krasnow | 310/156 |
| 3,740,600 | 6/1973 | Turley | 310/194 |
| 3,979,821 | 9/1976 | Noodleman | 29/598 |
| 4,117,360 | 9/1978 | Richter | 310/156 |

FOREIGN PATENT DOCUMENTS 2659650 11/1978 Fed. Rep. of Germany .

Primary Examiner—Carl E. Hall
Attorney, Agent, or Firm—Fay I. Konzem; Albert J. Miller

[57] ABSTRACT

A rotor assembly having a hub with rectangularly-shaped tongues and wedge-shaped permanent magnets.

3 Claims, 3 Drawing Figures

METHOD OF MAKING ROTOR RECTANGULARLY SHAPED TONGUES

This is a division of application Ser. No. 973,344 filed Dec. 6, 1978, now U.S. Pat. No. 4,260,921.

CROSS REFERENCE TO RELATED APPLICATIONS

This invention relates to subject matter disclosed in U.S. Pat. applications: Ser. No. 973,346, filed Dec. 26, 1978, by Alexander Silver, Frederick B. McCarty, entitled "Wedge-Shaped Permanent Magnet Rotor Assembly", now U.S. Pat. No. 4,242,610; Ser. No. 973,345, filed Dec. 26, 1978, by Jerry Glaser, entitled "Rotor Assembly Having Anchors With Undulating Sides"; and Ser. No. 973,343, filed Dec. 26, 1978, by Alexander Silver, Frederick B. McCarty and Lyman R. Burgmeier, entitled, "Rotor Assembly With Magnetic Cushions", now U.S. Pat. No. 4,302,693, each of which are assigned to the same assignee as this application.

BACKGROUND OF THE INVENTION

This invention relates to permanent magnet rotor assemblies, and more particularly, to rotor assemblies having a hub with rectangularly shaped tongues and wedge-shaped permanent magnets.

In the art, methods have been developed to join the non-magnetic hub to the magnetic pole pieces in a rotor assembly. One such method is the hot isostatic pressure (HIP) bonding process which is performed under extreme pressure (circa 18,000 p.s.i.a.) and at elevated temperatures (circa 2200° F.). Another method used to join the nonmagnetic and magnetic rotor materials together is furnace brazing, which is also performed at elevated temperatures (circa 1860° F.).

The elevated temperatures of either the HIP bonding or the brazing techniques reduce the strength of the two dissimilar metals, which is very undesirable in a high speed rotor where the strength of the rotor's components are of great importance.

SUMMARY OF THE INVENTION

The permanent magnet rotor assembly, in accordance with the invention, includes a rotatable hub with a plurality of equally spaced radially projecting tongues or spokes disposed around the outer periphery of the hub. The rotor assembly also includes inwardly converging wedge-shaped support members each having a central groove to fit over the tongue projecting from the hub to form an outwardly converging wedge-shaped opening between adjacent support members. The rotor assembly further consists of a plurality of outwardly converging wedge-shaped permanent magnets which are positioned in the openings formed between adjacent support members and which provide wedging action to squeeze the support members against the tongues.

A principal advantage of the present invention is that since the wedging action of the wedge-shaped magnets presses the support members and tongues together, a brazing alloy with a lower melting temperature than previously used brazing materials can be used to join the two materials. Becuase lower temperatures are used, the rotor assembly materials lose very little of their properties, such as their strength.

DETAILED DESCRIPTION OF THE PREFERRED EMBODIMENT

Figure 1:
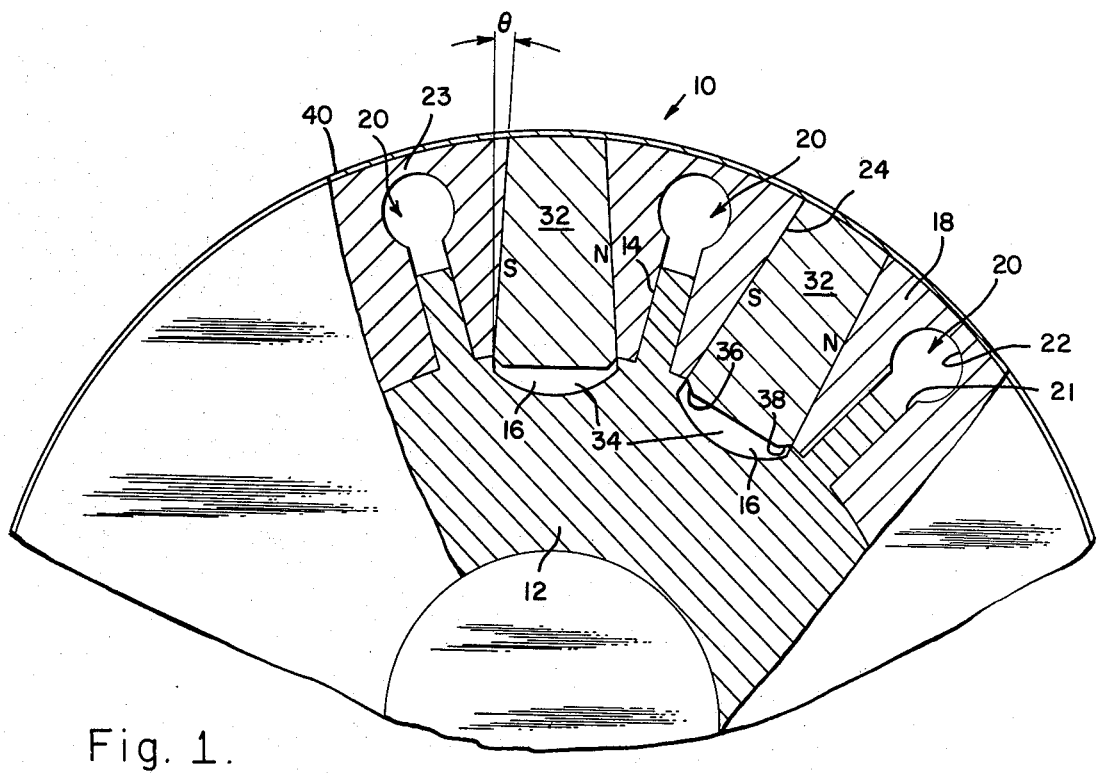
FIG. 1 is a cross-section view of the rotor assembly of the present invention with tangentially magnetized magnets.

Referring now to FIG. 1, a permanent magnet rotor assembly 10 includes a substantially cylindrical hub 12 with a plurality of equally spaced rectangularly shaped tongues 14 extending around the periphery thereof. Disposed between each pair of adjacent tongues 14 on the outer periphery of the hub 12 is a recess 16. In the tangentially magnetized configuration of FIG. 1, the hub 12 consists of a non-magnetic material.

A plurality of inwardly converging wedge-shaped support members 18, each having a groove 20, are positioned around the hub 12 such that the grooves 20 interlock with the tongues 14. The groove 20 generally comprises a rectangular slot 21 which opens to a circular hole 22. The rectangular slot 21 of the support members 18 fits over the tongues 14. The circular hole 22 of the groove 20 reduces the rotor's mass and allows air to flow through the rotor assembly 10 and to reduce the surface temperature of the assembly. Also, the hole 22 creates a flexible beam at 23 which allows the support members 18 to adjust their wedge angles. The support members 18 consist of a ferromagnetic material when tangentially magnetized magnets are used.

When the inwardly converging wedge-shaped support members 18 are interlocked with the tongues 14, the equally spaced support members form outwardly converging wedge-shaped openings 24 therebetween.

Figure 2:
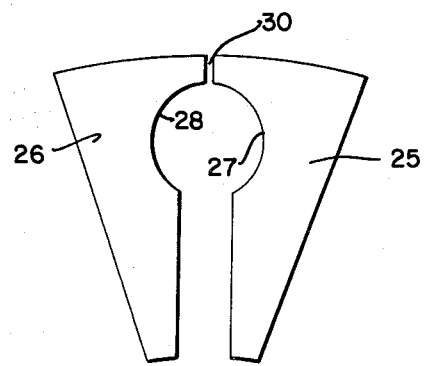
FIG. 2 shows a two-section support member.

While the support member 18 is shown as a single piece construction in FIG. 1, an alternative support member consisting of two substantially triangularly shaped sections 25 and 26 with semicircular recesses 27 and 28 respectively can be utilized as shown in FIG. 2. The two sections 25 and 26 which are much easier to fabricate can be joined by brazing them together at a junction 30.

The support members 18 of FIGS. 1 and 2 are joined to the hub 12 by brazing the sides of the tongues 14 to the straight sides of the slot 21 of the support members 18. The brazing of the support members 18 to the tongues 14 can be performed in the 1150°–1200° F. temperature range. Since this range of temperatures is relatively low, there is little loss of properties in the magnetic support member material.

Outwardly converging wedge-shaped permanent magnets 32 are located in the openings 24 between the support members 18. The magnets 32 are shorter in length than the distance from the base of the recess 16 to the outer periphery of the rotor assembly 10 thereby forming a gap 34 between the base of the magnet 32 and the base of the recess 16. The purpose of the gap is to facilitate assembly, and to further cool the rotor 10 by permitting cooling air to flow through the rotor assembly.

The base of the magnets 32 has slightly rounded corners 36 and 38 for easy insertion of the magnets 32 into the openings 24.

The size of the angle formed between the sides of the magnets 32 and a plane parallel to a central radius through the magnet is critical and should be slightly less than the angle of friction. This angle is experimentally determined and is the maximum angle at which a locking wedge action is achieved for the material and conditions pertinent to a given design. If the angle is too large the magnets will not remain locked in place after the rotor ceases to rotate and if the angle is too small, lateral crushing forces may cause the magnet to fracture. Therefore, there is a critical range within which the locking angle $\theta$ must lie. It has been found that the size of the locking angle $\theta$ should be between 2 to 9 degrees, preferably 6 to 8 degrees.

A thin hoop 40 which is heat shrunk upon the peripheral surface of the support members 18 functions as an electric damper to intercept and diminish the flux harmonics caused by the stator and penetrating into the support members 18 and into the magnets 32. Reflecting eddy currents are produced in the hoop 40, thereby shielding the permanent magnets 32 and the support members 18. The hoop 40 has a minor structural function, providing a retaining force over the peripheral contact with the magnets 32 and the support members 18. This retaining force is small and merely supplemental to the retaining provided by the hub 12. The hoop 40 consists of a high strength, non-magnetic material preferably having a low resistivity, such as a beryllium copper alloy.

The rotor assembly 10 is constructed by first sliding the rectangular portion of the slot 20 of the support member 18 onto the rectangularly shaped spokes 14 and by then brazing the support members 18 to the spokes 14 (at about 1200° F.). Next, the magnets are inserted into the space between the support members 18 followed by rotating the rotor assembly 10 at its maximum allowable speed. During rotation the magnets move radially outward due to centrifugal force. The magnets are then locked in place even after the rotor ceases rotating due to the compressive forces exerted on the magnets by the walls of the support members 18. Also, as centrifugal force moves the magnets radially outward the wedging action of the wedge-shaped magnets compresses the brazed joint between the support members 18 and the tongues 14 tighter as the speed of the rotor assembly increases. The outer portions of the support members 18 and the magnets 32 are then ground to the proper dimensions and the hoop 40 is shrunk onto the periphery, thus completing the assembly.

Figure 3:
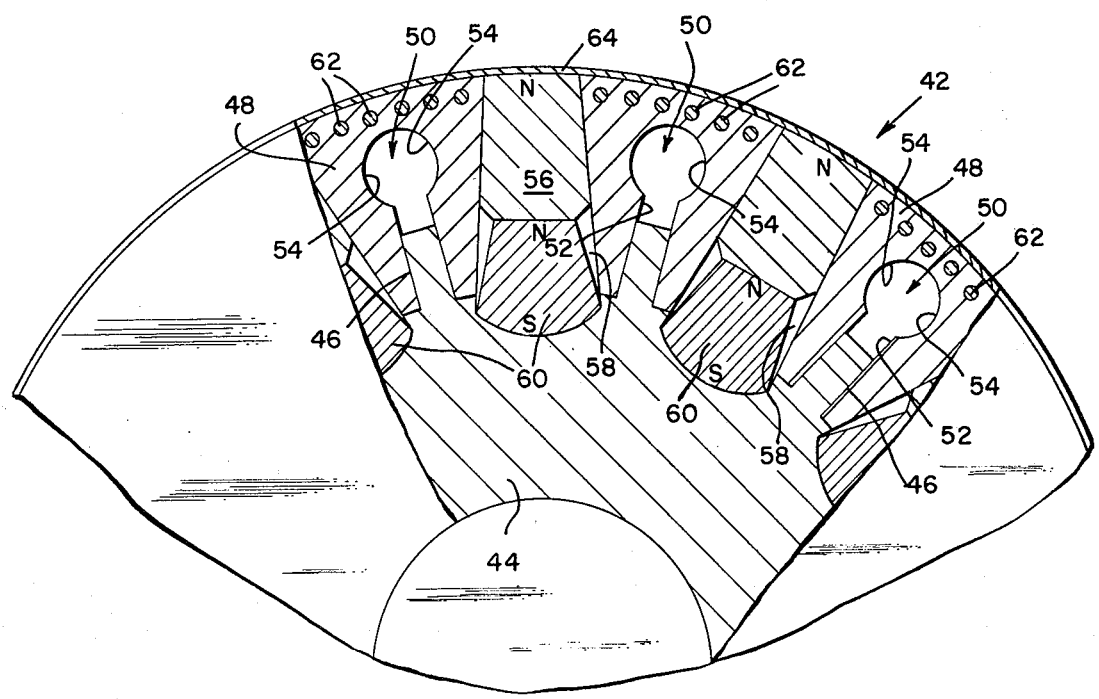
FIG. 3 is a variation of FIG. 1, whereby the magnets are radially magnetized.

FIG. 3 shows a permanent magnet rotor assembly 42 which includes a substantially cylindrical hub 44 with a plurality of equally shaped rectangularly-shaped tongues 46. The hub 44 consists of a magnetic material when radially magnetized magnets are used, as shown in FIG. 3.

A plurality of inwardly converging wedge-shaped support members 48 with a groove 50 are positioned to interlock with the tongues 46. The groove 50 has a rectangularly-shaped slot 52 opening to a circular hole 54. The rectangular slot 52 interlocks with the tongues 46. The circular-shaped hole 54 reduces the rotor's mass and allows air to flow through the rotor assembly 42 and to reduce the surface temperature of the assembly.

The support members 48 consist of a non-magnetic material when radially magnetized magnets are used.

Outwardly converging wedge-shaped permanent magnets 56 are located between the support members 48. The magnets 56 are shorter in length than the distance from the hub 44 to the outer periphery of the support members 48 thereby forming a gap 58 between the base of the magnet 56 and the hub 44.

The gap 58 is filled with a close shim 60 which consists of a ferromagnetic or permanent magnetic material. The shim 60 reduces the resistance of the magnetic path which is created by the gap 58.

The rotor assembly 10 of FIG. 3 also has dampening bars 62 which are located near the rotor's periphery and extend through the support members 48. The bars 62 function as an electric damper to diminish the flux harmonics caused by the stator. Also, a thin hoop 64, which is heat shrunk around the peripheral surface of the support members 48 and the magnets 56 provides added electrical dampening. Alternatively, the bars 62 can be used without the hoop 64.

The rotor 42 is assembled in a like manner to that of the rotor 10 of FIG. 1, described above. But with the rotor 42, the shim 60 is inserted into the gap 58 after the rotor has been rotated and so that the magnets 56 are locked in place.

While specific embodiments of the invention have been illustrated and described, it is to be understood that these embodiments are provided by way of example only and the invention is not to be construed as being limited thereto, but only by the proper scope of the following claims:

What is claimed is:

1. A method of forming a rotor for a permanent magnet machine, comprising the steps of:
   forming a rotor hub having a plurality of equally spaced, radially extending, elongated parallel sided tongues;
   bonding an inwardly converging, wedge-shaped support member, having an elongated, inwardly disposed parallel sided slot, over each radially extending, elongated parallel sided tongue to form a plurality of outwardly converging, wedge-shaped slots therebetween;
   inserting a plurality of wedge-shaped permanent magnets having outwardly converging sides, individual magnets disposed in individual outwardly converging wedge-shaped slots between support members; and
   rotating the rotor to wedge the outwardly converging permanent magnets into the outwardly converging slots to compress the sides of the support member slots on the tongues.

2. The method of claim 1 wherein the sides of the individual magnets form an angle within the range of 2-9 degrees with a plane parallel to the rotor radius through the center line of said individual magnets.

3. The method of claim 1 wherein the sides of the individual magnets form an angle within the range of 6-8 degrees with a plane parallel to the rotor radius through the center line of said individual magnets.

* * * * *